US012625713B2

(12) United States Patent
Zhou et al.

(10) Patent No.: US 12,625,713 B2
(45) Date of Patent: May 12, 2026

(54) NON-DISRUPTIVE HIBERNATING AND RESUMING GUEST ENVIRONMENT USING NETWORK VIRTUAL SERVICE CLIENT

(71) Applicant: Microsoft Technology Licensing, LLC, Redmond, WA (US)

(72) Inventors: Jie Zhou, Kirkland, WA (US); Dmitry Malloy, Redmond, WA (US); Khoa A. To, Redmond, WA (US); Omar Cardona, Bellvue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 585 days.

(21) Appl. No.: 17/931,401

(22) Filed: Sep. 12, 2022

(65) Prior Publication Data

US 2024/0086215 A1     Mar. 14, 2024

(51) Int. Cl.
*G06F 9/455* (2018.01)

(52) U.S. Cl.
CPC ...... *G06F 9/45545* (2013.01); *G06F 9/45558* (2013.01); *G06F 2009/45595* (2013.01)

(58) Field of Classification Search
CPC ......... G06F 9/45558; G06F 2009/4557; G06F 2009/45575; G06F 9/5077
See application file for complete search history.

(56) References Cited

U.S. PATENT DOCUMENTS

2009/0070760 A1* 3/2009 Khatri .................... G06F 9/5044
                                                    718/1
2009/0292858 A1* 11/2009 Lambeth ............. G06F 9/45558
                                                    711/6
2009/0327781 A1* 12/2009 Tripathi ................ G06F 9/5077
                                                    713/300
2011/0296411 A1* 12/2011 Tang ................... G06F 9/45545
                                                    718/1
2015/0178235 A1* 6/2015 Kanigicherla ...... H04L 41/0803
                                                    710/314

(Continued)

OTHER PUBLICATIONS

Chisnall, et al., "The Definitive Guide to the Xen Hypervisor", accessed on link https://www.mobt3ath.com/uplode/book/book-55475.pdf, Published on Jan. 1, 2008, retrieved on Jul. 9, 2020, 307 pages.

(Continued)

*Primary Examiner* — Dong U Kim

(57) ABSTRACT

Examples of the present disclosure describe systems and methods for non-disruptively hibernating and resuming a guest environment using a network virtual service client. In examples, when a guest environment is hibernated, a network virtual service client provides an instruction to a virtual network interface card to set the device power state of the virtual network interface card to a low power state. The network virtual service client disables the communication channels used by the network virtual service client and saves the operating state of the virtual network interface card. When the guest environment is resumed, the network virtual service client provides an instruction to set the device power state of the virtual network interface card to a full power state. The network virtual service client reenables the communication channels used by the network virtual service client and restores the operating state of the virtual network interface card.

20 Claims, 5 Drawing Sheets

(56)     References Cited

U.S. PATENT DOCUMENTS

| 2015/0309839 | A1* | 10/2015 | Lu | G06F 9/5077 |
| | | | | 718/1 |
| 2017/0054593 | A1* | 2/2017 | Borikar | H04L 41/0816 |
| 2018/0157496 | A1* | 6/2018 | Eide | G06F 8/62 |
| 2018/0314511 | A1* | 11/2018 | Butcher | G06F 8/654 |
| 2022/0019560 | A1* | 1/2022 | Durairaj | G06F 9/45558 |
| 2023/0229523 | A1* | 7/2023 | Simeonov | G06F 9/4856 |
| | | | | 718/105 |
| 2024/0039743 | A1* | 2/2024 | Pillai | H04L 12/12 |

OTHER PUBLICATIONS

International Search Report and Written Opinion received for PCT Application No. PCT/US23/030125, Nov. 23, 2023, 14 pages.
Kourai, et al., "Fast Software Rejuvenation of Virtual Machine Monitors", IEEE, vol. 8, 2011, pp. 839-851.
Macmichael, et al., "Introduction to Receive Side Scaling—Windows drivers: Microsoft Docs", Accessed on link https://docs.microsoft.com/en-us/windows-hardware/drivers/network/introduction-to-receive-side-scaling, Published on Apr. 20, 2017, Retrieved on Feb. 26, 2019, 5 pages.
International Preliminary Report on Patentability received for PCT Application No. PCT/US23/030125, Mar. 27, 2025, 09 pages.

* cited by examiner

300

Start

Receive Instruction to Set Power
State of NIC to High Power State            302

Set Power State of NIC to High
Power State            304

Reenable Communication Channel
Used to Communicate with NIC            306

Realign Communication Channel            308

Restore Operating State of NIC from
Persistent Memory            310

End

NON-DISRUPTIVE HIBERNATING AND RESUMING GUEST ENVIRONMENT USING NETWORK VIRTUAL SERVICE CLIENT

BACKGROUND

A virtual machine executing in a host computing environment can be halted (e.g., hibernated or shut down) upon request. When a virtual machine is halted, the virtual network interface card for the virtual machine purges the operating state of the virtual network interface card. When the virtual machine is resumed, the virtual machine requests configuration settings and other information from various components associated with the virtual machine to allow the virtual network interface card to recreate the purged operating state. Such requests are disruptive operations.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for non-disruptively hibernating and resuming a guest environment using a network virtual service client. In examples, when a guest environment is hibernated, a network virtual service client provides an instruction to a virtual network interface card to set the device power state of the virtual network interface card to a low power state. The network virtual service client disables the communication channels between the network virtual service client and a network virtual service provider. The network virtual service client also saves the operating state of the virtual network interface card in memory. When the guest environment is resumed, the network virtual service client provides an instruction to the virtual network interface card to set the device power state of the virtual network interface card to a full power state. The network virtual service client reenables the communication channels between the network virtual service client and the network virtual service provider. The network virtual service client restores the operating state of the virtual network interface card from the memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
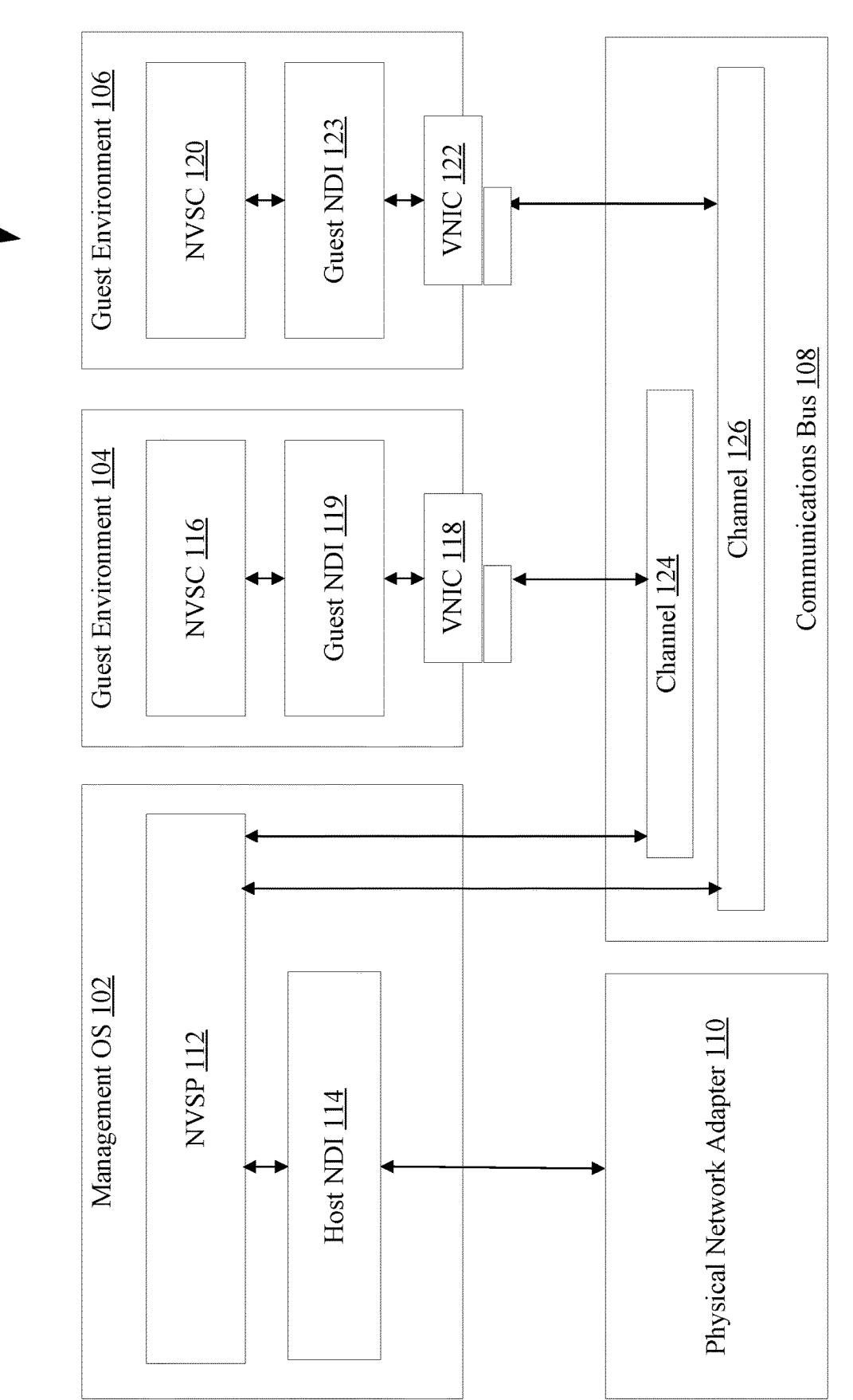
FIG. 1 illustrates an example computing environment for non-disruptively hibernating and resuming a guest environment using a network virtual service client.

A host operating system (OS) is capable of hosting and executing one or more guest environments, such as a virtual machine (VM) or a container. When a guest environment is executing, the guest environment consumes resources (e.g., processing, networking, storage) of the host OS. When the guest environment is hibernated (e.g., put into a hibernation mode or a similar reduced power mode), the guest environment ceases consuming resources of the host OS or consumes significantly fewer resources of the host OS.

Upon hibernation of the guest environment, the virtual network interface card (VNIC) utilized by the guest environment purges the operating state of the VNIC. The operating state comprises receive side scaling (RSS) configuration data, Transmission Control Protocol/Internet Protocol (TCP/IP) and other network stack upper layer protocol offloads or configurations, and/or other configuration settings associated with the guest environment. RSS, as used herein, is a network driver technology that enables the efficient distribution of network receive processing across multiple central processing units (CPUs) in multiprocessor systems. In addition to purging the operating state of the VNIC, the communication channels (e.g., the VM bus channels) between the guest environment and a component managing the guest environment (e.g., a host OS, a hypervisor, a network virtual service provider) are removed.

Previously, when the guest environment was resumed, the guest environment was required to request configuration settings and other information from various components associated with the guest environment to allow the VNIC to recreate the purged operating state. As one example, the guest environment requests configuration settings from the network stack of the guest environment to enable the VNIC to reconfigure the offloaded protocol functionality for various upper layer protocols of the network stack. Such requests are disruptive to the network stack and to applications that may be impacted by the requests. Additionally, the communication channels between the guest environment and the component managing the guest environment must be recreated, which takes time and consumes resources.

The present disclosure provides a solution that enables non-disruptively hibernating and resuming a guest environment using a network virtual service client. In embodiments of the present disclosure, a host OS comprises a virtual management OS that includes a network virtual service provider (NVSP) and a network driver interface (NDI) ("host NDI"). The NVSP is a component, such as a software driver, that handles network requests from guest environments. The host NDI enables interfacing with upper layer protocols, such as filter drivers, intermediate drivers, and protocol drivers. The host OS also comprises a guest environment that includes a network virtual service client (NVSC) and a VNIC. The NVSC is a component, such as a software driver, that exposes a virtualized view of a physical network adapter of the host OS and transmits network requests between the guest environment and the NVSP. The NVSC advertises a capability to perform power management for the VNIC to an NDI implemented by the guest environment ("guest NDI"). The VNIC represents the network interface configuration for a guest environment and provides connectivity between the guest environment and a physical network.

When the guest environment is hibernated, the guest NDI provides an instruction to the NVSC to set the device power state of the VNIC to a low (or lower) power state. In examples, the instruction is in the form of an object (e.g., an information element) or an object identifier (OID) for an object. While the guest environment is hibernated, the guest NDI prevents additional instructions from being sent to the VNIC. Upon setting the device power state of the VNIC to the low power state, the NVSC disables the communication channels between the NVSC and the NVSP and saves the operating state of the VNIC to a persistent memory location of the host OS.

When the guest environment is resumed, the guest NDI provides an instruction to the NVSC to set the device power state of the VNIC to a full power state (or a power state that enables the VNIC to resume functionality). In response to resuming the guest environment, the guest NDI ceases preventing instructions from being sent to the VNIC. Upon setting the device power state of the VNIC to the full power state, the NVSC reenables and realigns the communication channels that were disabled during hibernation of the guest environment. The NVSC then restores the operating state of the VNIC from the memory of the NVSC, thereby enabling the guest environment to be efficiently and non-disruptively hibernated and resumed, as the upper layer protocols of the guest environment need not be aware that the low-level NVSC has hibernated or resumed the VNIC.

Accordingly, the present disclosure provides a plurality of technical benefits and improvements over previous solutions for hibernating and restoring guest environment. These technical benefits and improvements include: storing the operating state of a VNIC in a persistent memory location during hibernation of a guest environment, restoring the operating state of a VNIC from the persistent memory location when the guest environment is resumed, and restoring the operating state of a VNIC without recreating communication channels between the NVSC and the NVSP or requesting configuration settings from upper layer protocols or applications of the guest environment, among others. These technical benefits and improvements result in less disruption to systems and components related to and in communication with the VNIC, faster wake (e.g., resume from hibernation) times for VNICs, and enable more reliable waking of VNICs and/or guest environments.

FIG. 1 illustrates a computing environment for non-disruptively hibernating and resuming a guest environment using a NVSC. Example computing environment 100 as presented is a combination of interdependent components that interact to form an integrated whole. Components of computing environment 100 may be hardware components or software components (e.g., application programming interfaces (APIs), modules, runtime libraries) implemented on and/or executed by hardware components of computing environment 100. In one example, components of computing environment 100 are distributed across multiple computing devices or computing systems.

In FIG. 1, computing environment 100 comprises management OS 102, guest environments 104 and 106, communications bus 108, and physical network adapter 110. The scale and structure of computing environment 100 may vary and may include additional or fewer components and environments than those described in FIG. 1. In examples, computing environment 100 is implemented by a host computing device as part of a virtualized computing environment. Examples of the host computing device include personal computers (PCs), server devices, mobile devices (e.g., smartphones, tablets, laptops, personal digital assistants (PDAs)), wearable devices (e.g., smart watches, smart eyewear, fitness trackers, smart clothing, body-mounted devices, head-mounted displays), gaming consoles or devices, and Internet of Things (IoT) devices.

Management OS 102 has direct access to physical memory and devices of the host computing device and manages machine-level functions, such as device drivers, power management, and device addition and removal. Management OS 102 creates and initiates guest environments 104 and 106 and manages the state of guest environments 104 and 106. Management OS 102 also handles requests (e.g., network requests and device access requests) transmitted to and from guest environments 104 and 106.

Management OS 102 comprises NVSP 112 and host NDI 114. NVSP 112 provides services to support networking access for guest environments 104 and 106. NVSP 112 communicates over communications bus 108 to handle requests from guest environments 104 and 106. Host NDI 114 manages NICs implemented by the host OS of the host computing device and sends and receives data through the NICs. Managing a NIC includes providing power management instructions, device security instructions, and other types of instructions and device configuration options to the NIC.

Guest environments 104 and 106 are emulations (e.g., virtualizations) of physical computing devices and/or OSs and use software to provide functionality of a physical computing device. Examples of guest environments 104 and 106 include VMs, containers, and other virtual OSs and environments. In examples, guest environments 104 and 106 do not have direct access to physical memory and devices of the host computing device. Instead, guest environments 104 and 106 request access to the physical memory and devices of the host computing device via management OS 102.

Guest environment 104 comprises NVSC 116, VNIC 118, and guest NDI 119. NVSC 116 exposes a virtualized view of physical network adapter 110 to guest environment 104 and transmits requests between guest environment 104 and NVSP 112 via communications bus 108. In examples, NVSC 116 advertises a capability to perform power management for VNIC 118 to guest NDI 119. This advertisement by NVSC 116 enables guest NDI 119 to transmit instructions, such as device power transition instructions, to VNIC 118. NVSC 116 tracks and saves the operating state of VNIC 118 in response to various events, such as power management events for VNIC 118. The operating state of VNIC 118 is stored in a persistent memory location by NVSC 116. During such events, NVSC 116 also manages communications between guest environment 104 and NVSP 112. As a specific example, NVSC 116 disables communication channel 124 of communication bus 108. Disabling a communication channel does not remove the communication channel or make the communication channel permanently inoperable. Instead, disabling the communication channel temporarily deactivates the communication channel.

VNIC 118 is a virtualized view of physical network adapter 110. VNIC 118 enables guest environment 104 to transmit data to/from a physical network via physical network adapter 110. In examples, VNIC 118 is configured in accordance with RSS configuration data for guest environment 104. The RSS configuration data specifies to VNIC 118 the manner in which data packets received by VNIC 118 are to be distributed among the CPUs of guest environment 104. VNIC 118 also implements protocol functionality offloaded from upper layer protocols. In a specific example, the handling of address resolution protocol (ARP) requests and the robust secure network (RSN) handshake are offloaded to VNIC 118. VNIC 118 comprises multiple power states that affect the functionality of VNIC 118. In one example, VNIC 118 comprises a full power state, an intermediate power state, and a low power state. In the full power state, the full functionality of VNIC 118 is available. In the intermediate power state, a subset of the functionality of VNIC 118 is available (e.g., event logging functionality is available, but data transmission functionality is unavailable). In the low power state, all functionality of VNIC 118 is unavailable.

Guest NDI 119 manages VNIC(s) implemented by guest environment 104, such as VNIC 118, and sends and receives data through the VNIC(s). Managing a VNIC includes providing power management instructions, device security instructions, and other types of instructions and device configuration options to the VNIC. Managing a VNIC also includes preventing instructions from being sent to the VNIC during or in response to certain events. As a specific example, guest NDI 119 prevents instructions from being sent to VNIC 118 when guest environment 104 is hibernated or shut down. Guest NDI 119 interfaces with upper layer protocols (e.g., filter drivers, intermediate drivers, protocol drivers) through a software library comprising functions that encapsulate various OS functions of the host computing device.

Guest environment 106 comprises NVSC 120, VNIC 122, and guest NDI 123. NVSC 120 exposes a virtualized view of physical network adapter 110 to guest environment 106 and transmits requests between guest environment 106 and NVSP 112 via communications bus 108. NVSC 120 advertises a capability to perform power management for VNIC 122 to guest NDI 123 and manages the operating state of VNIC 122, as discussed with respect to NVSC 116 and VNIC 118. In some implementations, VNIC 122 is similar in functionality and configuration to VNIC 118. In some implementations, Guest NDI 123 is similar in functionality and configuration to guest NDI 119.

Communications bus 108 is a virtual communication mechanism for transmitting requests and other data between NVSP 112 and guest environments 104 and 106. Communications bus 108 comprises communication channels 124 and 126. In FIG. 1, communication channel ("channel") 124 is used to transmit requests between NVSC 116 and NVSP 112 and channel 126 is used to transmit requests between NVSC 120 and NVSP 112. However, in alternative embodiments, channels 124 and 126 are configured differently. In one example, channel 124 transmits requests between NVSC 120 and NVSP 112 and channel 126 transmits requests between NVSC 116 and NVSP 112. In another example, channel 124 transmits data between NVSC 116 and NVSC 120, and channel 126 transmits data between NVSC 116 and NVSP 112 and between NVSC 120 and NVSP 112. Channels 124 and/or 126 can be collectively or individually disabled by NVSC 116 or NVSC 120 in response to certain events, such as the hibernation or shutdown of guest environment 104, guest environment 106, VNIC 118, and/or VNIC 122.

Physical network adapter 110 is a hardware component of the host computing device that connects the host computing device to a physical network. Physical network adapter 110 enables guest environments 104 and 106 to communicate with physical networks that are external to the host computing device.

Having described devices and environments that may employ aspects of the present disclosure, methods for performing these aspects will now be described. In examples, methods 200 and 300 may be executed by a device, such as the host computing device described in FIG. 1. However, methods 200 and 300 are not limited to such examples.

Figure 2:
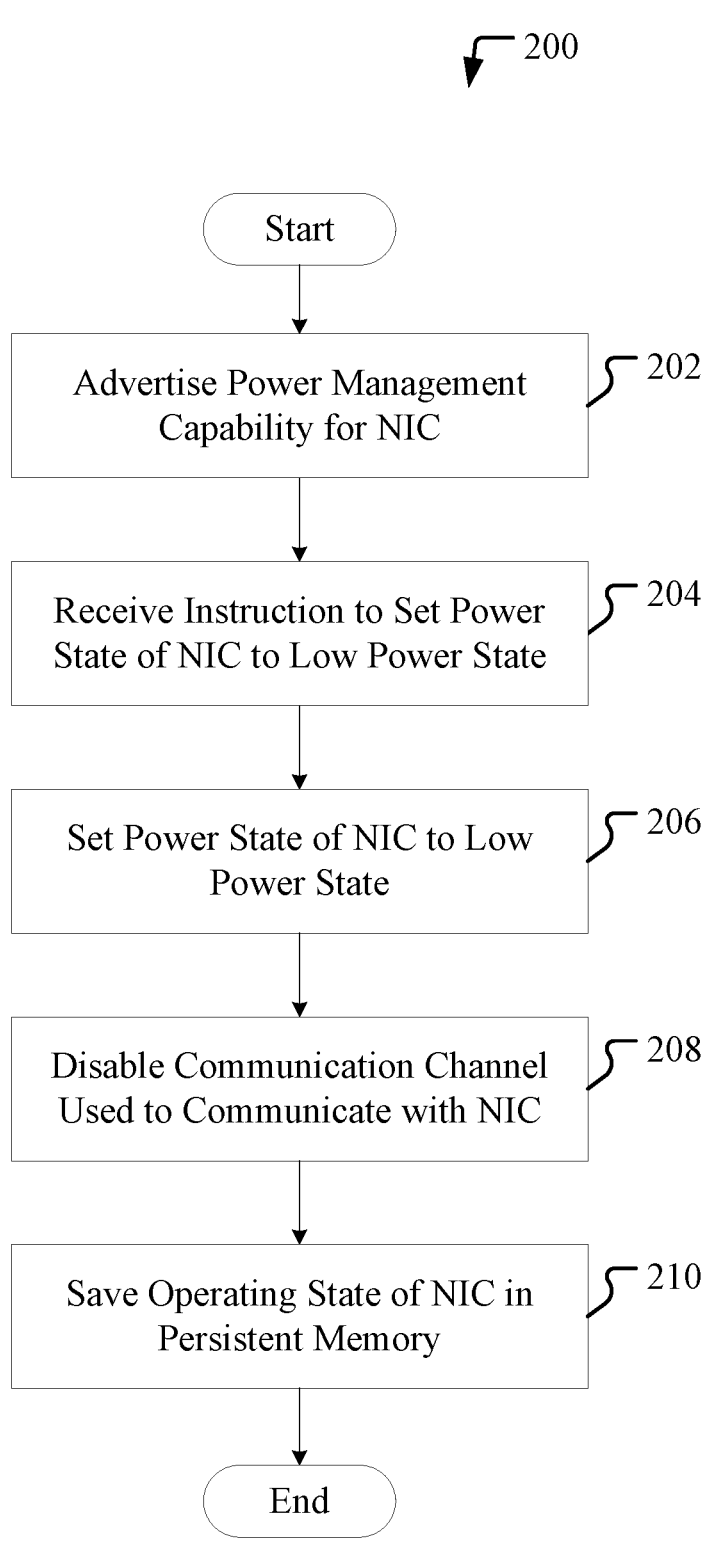
FIG. 2 illustrates an example method for non-disruptively hibernating a guest environment using a network virtual service client.

FIG. 2 illustrates a method for non-disruptively hibernating a guest environment using a NVSC. Method 200 begins at operation 202, where a NVSC implemented in a guest environment, such as NVSCs 116 and 120, advertises a capability to provide power management for a NIC implemented in the guest environment, such as VNICs 118 and 122. The NVSC advertises the power management capability to a driver interface mechanism, such as guest NDIs 119 and 123, implemented by a management system, such as management OS 102. The NVSC and the management system are implemented in a virtual environment hosted by a host computing device. In one example, the NVSC advertises the power management capability by transmitting an advertisement message to the driver interface mechanism. The advertisement message includes an identifier of the NIC (e.g., VNIC 118 or 122) and a list of power management events that can be managed by the NVSC. The advertisement message is sent periodically (e.g., once a day or week) or in response to a detected event (e.g., starting or resuming a guest environment, a software update, adding or removing a component). In another example, the NVSC advertises the power management capability by setting a configuration option of the NVSC (e.g., a flag, a parameter value, a software version number) that is accessible to, or can be queried by, the driver interface mechanism.

In some examples, in response to identifying the advertisement of the power management capability, the driver interface mechanism transmits a confirmation message to the NVSC indicating that the NVSC will be used to provide power management for the MC. Based on the confirmation message, the NVSC configures the NIC to receive device power state instructions from the driver interface mechanism. In other examples, the NIC has been preconfigured to receive device power state instructions from the driver interface mechanism. As such, the NVSC does not need to configure the NIC to receive device power state instructions from the driver interface mechanism.

At operation 204, the NVSC receives an instruction to set the power state of the NIC to a low (or lower) power state. The instruction is provided by the driver interface mechanism and, in some examples, is in the form of an OID for an object managed by the driver interface mechanism. For instance, the instruction is a SET POWER OID corresponding to an object for setting the power state of a VNIC. In examples, the instruction is provided to the NVSC in response to a power event (e.g., hibernation, shutdown, maintenance mode) for a guest environment associated with the VNIC, such as guest environments 104 and 106.

At operation 206, the NVSC sets the power state of the VNIC to the low power state in accordance with the received instruction. Setting the power state of the VNIC includes updating a first power state value to a second power state value or assigning a power state value to a previously empty or null value. The power states of the VNIC are represented using numeric values, text labels (e.g., low, intermediate, high, sleeping, hibernating), or any other indication method (e.g., color or image). In one example, the power states of the VNIC are represented as a numeric value on a scale of 0 to 3, where 0 indicates full power (e.g., full functionality is available), 1 indicates a high power sleeping state (e.g., a subset of functionality is available), 2 indicates an intermediate power sleeping state (e.g., a subset of functionality is available and less power is used than state 1), and 3 indicates a lower power sleeping state (e.g., no functionality or only a subset of functionality is available and less power is used than state 2). While the VNIC is set to the low power state, the driver interface mechanism prevents additional instructions from being sent to the VNIC.

At operation 208, the NVSC disables communication channels used to communicate between the VNIC and the management system. In examples, the communication channels are used to transmit requests and other data between the management system and the guest environment associated with the VNIC. Communication channels used by the guest environment associated with the VNIC to communicate with other guest environments in the virtual environment may also be disabled. Disabling a communication channel includes temporarily suppressing the data transmissions of the communication channel or temporarily deactivating the ability of the communication channel to receive requests or other data transmissions. Disabling a communication channel does not remove or destroy the communication channel. In some examples, the guest environment associated with the VNIC ("first guest environment") shares the virtual environment with a guest environment having a VNIC that has not received an instruction to change power states ("second guest environment"). For instance, the first guest environment is being hibernated and the second guest environment is not being hibernated. In such examples, the communication channel(s) for the first guest environment are disabled and the communication channel(s) for the second guest environment are not disabled.

At operation 210, the NVSC saves the operating state of the VNIC in a persistent memory location. Saving the operating state of the VNIC comprises saving the RSS configuration data of the VNIC, protocol functionality offloaded to the VNIC from upper layer protocols, and any other previously configured configuration settings from upper layer protocols that have been provided to the VNIC. In one example, the RSS configuration data is stored in the VNIC as a table (or a similar data structure) and specifies an alignment of communication channels between the NVSC and the management system. For instance, the alignment specifies that a particular communication channel (or particular group of communication channels), such as channels 124 and/or 126, is to be used to transmit requests or other data transmissions between a guest environment and a NVSP implemented by the management system, such as NVSP 112. In some examples, the RSS configuration data also specifies that particular transmission queues of the VNIC are to receive particular types of data packets. The NVSC saves the operating state of a VNIC in persistent memory such that the operating state of the VNIC is not lost when a guest environment is hibernated. As one examples, the NVSC stores the operating state as blob of memory objects in a hard disk drive of the host computing device.

Figure 3:
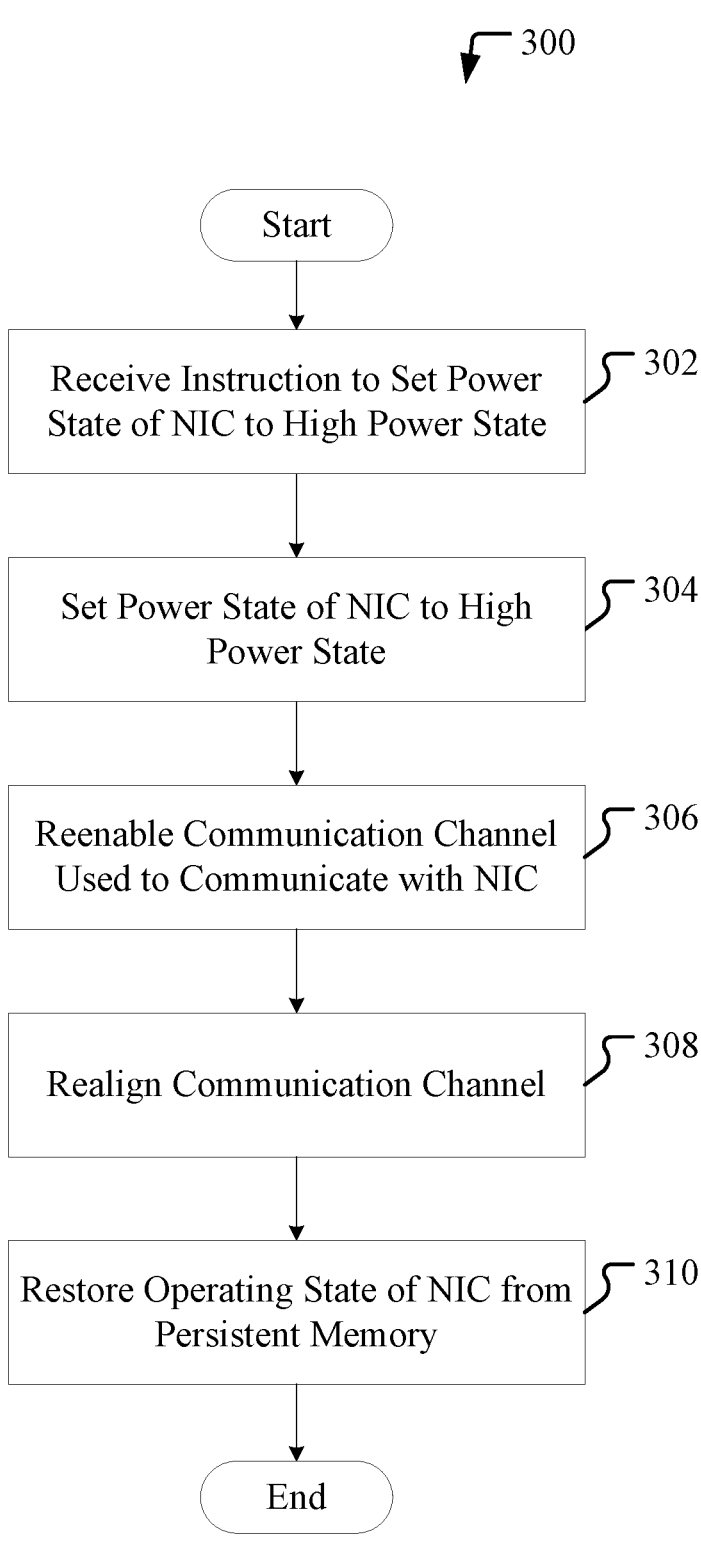
FIG. 3 illustrates an example method for non-disruptively resuming a guest environment using a network virtual service client.

FIG. 3 illustrates a method for non-disruptively resuming a guest environment using a NVSC. In some examples, the operations of FIG. 3 follow or precede the operations of FIG. 2. As a specific example, operation 210 of method 200 may proceed to method 302 of FIG. 3. Method 300 begins at operation 302, where a NVSC implemented in a guest environment, such as NVSCs 116 and 120, receives an instruction to set the power state of a VNIC implemented in the guest environment, such as VNICs 118 and 122, to a high (or higher) power state. The instruction is provided by a driver interface mechanism, such as guest NDIs 119 and 123, implemented by the guest environment. The NVSC and the management system are implemented in a virtual environment hosted by a host computing device. In examples, the instruction is provided to the NVSC in response to a power event (e.g., resume, start up, exit maintenance mode) for a guest environment associated with the VNIC, such as guest environments 104 and 106.

At operation 304, the NVSC sets the power state of the VNIC to the high (or higher) power state in accordance with the received instruction. Setting the power state of the VNIC includes updating a first power state value to a second power state value or assigning a power state value to a previously empty or null value, as discussed with respect to operation 206 of FIG. 2. When the VNIC is set to the high(er) power state, the driver interface mechanism, which prevents instructions from being sent to the VNIC when the VNIC is in a low (or lower) power state, ceases preventing instructions from being sent to the VNIC.

At operation 306, the NVSC reenables previously disabled communication channels used to communicate between the VNIC and the management system. Communication channels used by the guest environment associated with the VNIC to communicate with other guest environments in the virtual environment may also be reenabled. Reenabling a communication channel includes ceasing suppression of the data transmissions of the communication channel or reactivating the ability of the communication channel to receive requests or other data transmissions.

At operation 308, the NVSC realigns the reenabled communication channels. Realigning the communication channels includes assigning a specific communication channel (or group of communication channels), such as channels 124 and/or 126, to transmit requests or other data transmissions between a guest environment and the management system. In some examples, realigning the communication channels also includes assigning particular transmission queues of the VNIC to receive particular types of data packets (e.g., raw Internet protocol (IP) packets, Internet control message protocol (ICMP) packets, user datagram protocol (UDP) packets, transmission control protocol (TCP) packets).

At operation 310, the NVSC restores the operating state of the NIC. Restoring the operating state of the VNIC comprises retrieving the operating state from a persistent memory location of the host computing device. In examples, the operating state comprises RSS configuration data of the VNIC, protocol functionality offloaded to the VNIC from upper layer protocols, and any other previously configured configuration settings from upper layer protocols that have been provided to the VNIC. In one example, the protocol functionality offloaded to the VNIC from the upper layer protocols includes lower power protocol offloads, such as IP version 4 (IPv4) ARP, IP version (IPv6) neighbor solicitation (NS), and Institute of Electrical and Electronics Engineers (IEEE) technical standard 802.11 RSN 4-way and 2-way handshake. Upon restoring the operating state of the VNIC, the guest environment associated with the VNIC is again able to communicate with physical networks external to the host computing device. Accordingly, the operations of FIGS. 2 and 3 provide for hibernating and resuming a guest environment efficiently and seamlessly to a user in a manner that is non-disruptive to the network stack and the applications of the guest environment.

Figure 4:
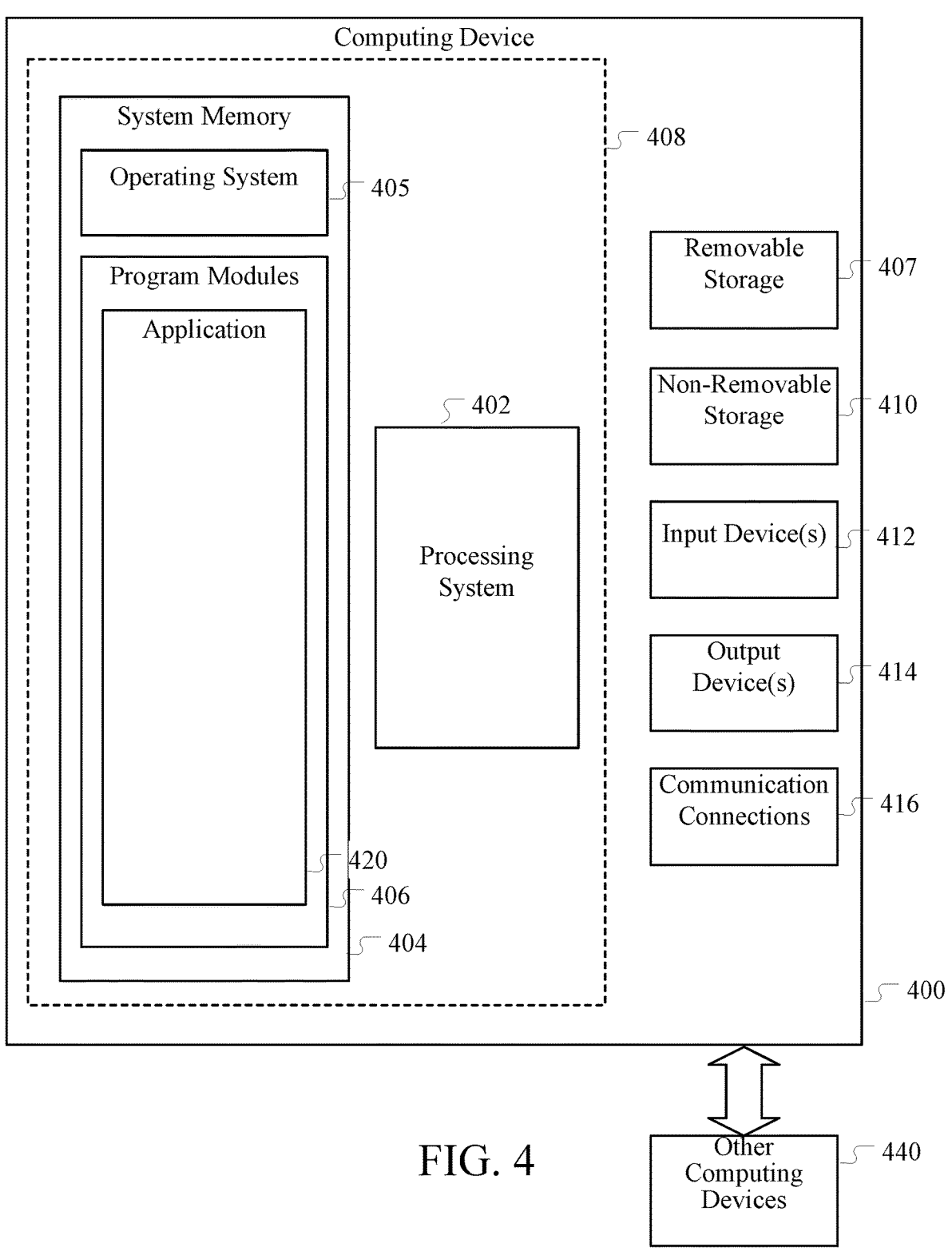
FIG. 4 is a block diagram illustrating example physical components of a computing device for practicing aspects of the disclosure.
Figure 5:
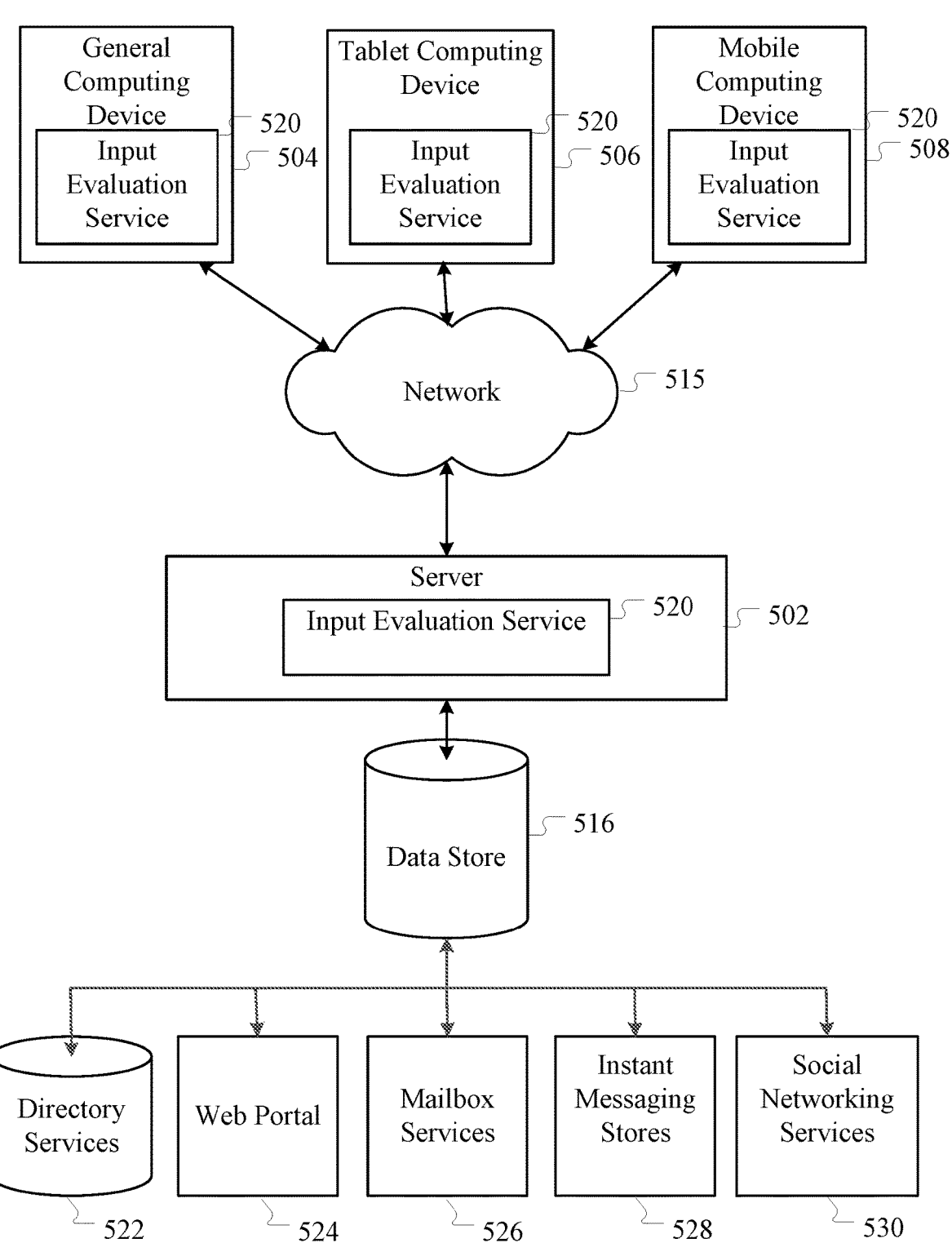
FIG. 5 is a simplified block diagram of an example distributed computing system for practicing aspects of the present disclosure.

FIGS. 4-5 and the associated descriptions provide a discussion of a variety of operating environments in which aspects of the disclosure may be practiced. However, the devices and systems illustrated and discussed with respect to FIGS. 4-5 are for purposes of example and illustration, and, as is understood, a vast number of computing device configurations may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes a processing system 402 comprising at least one processing unit and a system memory 404. Depending on the configuration and type of computing device, the system memory 404 may comprise volatile storage (e.g., random access memory), non-volatile storage (e.g., read-only memory), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 407 and a non-removable storage device 410.

As stated above, a number of program modules and data files may be stored in the system memory 404. While executing on the processing system 402, the program modules 406 (e.g., application 420) may perform processes including the aspects, as described herein. Other program modules that may be used in accordance with aspects of the present disclosure include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include radio frequency (RF) transmitter, receiver, and/or transceiver circuitry; universal serial bus (USB), parallel, and/or serial ports.

The term computer readable media as used herein includes computer storage media. Computer storage media may include volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media may include random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530.

An input evaluation service 520 may be employed by a client that communicates with server device 502, and/or input evaluation service 520 may be employed by server device 502. The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device

508 (e.g., a smart phone). Any of these embodiments of the computing devices may obtain content from the store 516, in addition to receiving graphical data useable to be either pre-processed at a graphic-originating system, or post-processed at a receiving computing system.

As will be understood from the present disclosure, one example of the technology discussed herein relates to a system comprising: a processor; and memory coupled to the processor, the memory comprising computer executable instructions that, when executed by the processor, perform operations. The operations comprise: receiving, by a network virtual service client (NVSC) implemented in a guest environment, an instruction to set a power state of a network interface card (NIC) to a lower power state, wherein the NIC is implemented in the guest environment; setting the power state of the NIC to the lower power state based on the instruction; disabling a communication channel between the NIC and a management operating system (OS) that manages the guest environment; and saving an operating state of the NIC in a persistent memory location.

In another example, the technology discussed herein relates to a system comprising: a processor; and memory coupled to the processor, the memory comprising computer executable instructions that, when executed by the processor, perform operations. The operations comprise: receiving, by a network virtual service client (NVSC) implemented in a guest environment, an instruction to set a power state of a network interface card (NIC) to a higher power state, wherein the NIC is implemented in the guest environment; setting the power state of the NIC to the higher power state based on the instruction; enabling a communication channel between the NIC and a management operating system (OS) that manages the guest environment; aligning the communication channel between the NIC and the management OS; and restoring an operating state of the NIC from a persistent memory location.

In another example, the technology discussed herein relates to a method comprising: receiving, by a network virtual service client (NVSC) of a guest environment, an instruction to set a power state of a network interface card (NIC) to a lower power state, wherein the instruction is provided by a virtual management component that manages the guest environment; setting, by the NVSC, the power state of the NIC to the lower power state based on the instruction; disabling, by the NVSC, a communication channel between the NIC and the virtual management component; and saving an operating state of the NIC in a persistent memory location.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processing system; and
memory coupled to the processing system, the memory comprising computer executable instructions that, when executed by the processing system, perform operations comprising:
receiving, by a network virtual service client (NVSC) implemented in a virtual machine or a virtual container, an instruction to set a power state of a network interface card (NIC) of the virtual machine or the virtual container to a lower power state;
setting, by the NVSC, the power state of the NIC to the lower power state based on the instruction, wherein the low power state prevents communication between the virtual machine or the virtual container and a management operating system (OS) that manages the virtual machine or the virtual container;
disabling, by the NVSC, a communication channel between the NIC and the management OS; and
saving, by the NVSC, an operating state of the NIC in a persistent memory location, wherein the operating state comprises receive side scaling (RSS) configuration data stored by the NIC and specifying an alignment between the management OS, the communication channel, and the virtual machine or the virtual container.

2. The system of claim 1, wherein the management OS is implemented in the virtual machine or the virtual container.

3. The system of claim 1, the operations further comprising:
advertising, by the NVSC, a capability to provide power management for the NIC to a driver interface implemented by the virtual machine or the virtual container.

4. The system of claim 3, wherein advertising the capability to provide power management comprises at least one of:
transmitting an advertisement message to the driver interface; or
setting a configuration option of the NVSC that is accessible by the driver interface.

5. The system of claim 1, wherein the instruction is provided by the management OS in response to hibernation of the virtual machine or the virtual container.

6. The system of claim 1, wherein the management OS prevents additional instructions from being sent to the NIC while the power state of the NIC is set to the lower power state.

7. The system of claim 1, wherein the lower power state prevents the NIC from transmitting data.

8. The system of claim 1, wherein disabling the communication channel comprises at least one of:
temporarily suppressing data transmissions over the communication channel; or
temporarily deactivating an ability of the communication channel to receive data transmissions.

9. The system of claim 1, wherein the operating state of the NIC further comprises
protocol functionality offloaded to the NIC from an upper layer protocol.

10. The system of claim 1, wherein the RSS configuration data further specifies particular transmission queues of the NIC are to receive particular types of data packets.

11. A system comprising:
a processing system; and
memory coupled to the processing unit, the memory comprising computer executable instructions that, when executed by the processing system, perform operations comprising:
receiving, by a network virtual service client (NVSC) implemented in a guest environment virtual machine or a virtual container, an instruction to set a power state of a network interface card (NIC) of the virtual machine or the virtual container to a higher power state;
setting, by the NVSC, the power state of the NIC to the higher power state based on the instruction, wherein the high power state restores communication between the virtual machine or the virtual container and a management operating system (OS) that manages the virtual machine or the virtual container;
enabling, by the NVSC, a communication channel between the NIC and the management OS;
aligning, by the NVSC, the communication channel between the NIC and the management OS; and
restoring, by the NVSC, an operating state of the NIC from a persistent memory location, wherein the operating state comprises receive side scaling (RSS) configuration data stored by the NIC and specifying the alignment between the management OS, the communication channel, and the virtual machine or the virtual container.

12. The system of claim 11, wherein the instruction is provided by the management OS in response to resuming the guest environment from hibernation.

13. The system of claim 11, wherein setting the power state of the NIC to the high power state causes the management OS to allow instructions intended for the NIC.

14. The system of claim 11, wherein the NIC is configured to be set to a plurality of power states including:
a lower power state;
an intermediate power state; and
the higher power state.

15. The system of claim 14, wherein:
in the lower power state, functionality of the NIC is unavailable;
in the intermediate power state, a subset of the functionality of the NIC is available; and
in the higher power state, full functionality of the NIC is available.

16. The system of claim 11, wherein enabling the communication channel comprises at least one of:
ceasing suppression of data transmissions of the communication channel; or
reactivating an ability of the communication channel to receive data transmissions.

17. The system of claim 11, wherein restoring the operating state of the NIC comprises further retrieving from the persistent memory location
protocol functionality offloaded to the NIC.

18. A method comprising:
receiving, by a network virtual service client (NVSC) of a guest environment, an instruction to set a power state of a network interface card (NIC) to a lower power state, wherein the instruction is provided by a virtual management component that manages the guest environment and the guest environment is a virtual machine or a virtual container;
setting, by the NVSC, the power state of the NIC to the lower power state based on the instruction, wherein the low power state prevents communication between the guest environment and the virtual management component;
disabling, by the NVSC, a communication channel between the NIC and the virtual management component; and
saving, by the NVSC, an operating state of the NIC in a persistent memory location, wherein the operating state comprises receive side scaling (RSS) configuration data stored by the NIC and specifying an alignment between the virtual management component, the communication channel, and the guest environment.

19. The method of claim 18, further comprising:
advertising, by the NVSC, a capability to provide power management for the NIC.

20. The method of claim 19, wherein advertising the capability to provide power management comprises at least one of:
transmitting an advertisement message to a driver interface of the guest environment; or
setting a configuration option of the NVSC that is accessible by the driver interface.

* * * * *